United States Patent [19]

Ueda

[11] Patent Number: 4,959,724
[45] Date of Patent: Sep. 25, 1990

[54] SOLID-STATE IMAGING APPARATUS AND METHOD OF DRIVING THE SAME

[75] Inventor: Kazuhiko Ueda, Yokohama, Japan

[73] Assignee: Victor Company of Japan, Ltd., Japan

[21] Appl. No.: 357,498

[22] Filed: May 26, 1989

[30] Foreign Application Priority Data

May 27, 1988 [JP] Japan .................. 63-129986

[51] Int. Cl.$^5$ .............................. H04N 3/14
[52] U.S. Cl. ...................... 358/213.29; 358/213.22
[58] Field of Search .................. 358/213.26, 213.22, 358/213.29, 213.11, 909; 357/246 R

[56] References Cited

U.S. PATENT DOCUMENTS

| | | | |
|---|---|---|---|
| 4,686,573 | 8/1987 | Murayama et al. | 358/213.22 |
| 4,788,592 | 11/1988 | Yamawaki et al. | 358/213.29 |
| 4,837,630 | 6/1989 | Ueda | 358/213.29 |
| 4,839,734 | 6/1989 | Takemura | 358/213.26 |
| 4,853,786 | 8/1989 | Yamawaki et al. | 358/213.26 |
| 4,878,121 | 10/1989 | Hynecek | 358/213.26 |

Primary Examiner—Stephen Brinich
Attorney, Agent, or Firm—Lowe, Price, LeBlanc, Becker & Shur

[57] ABSTRACT

During a first blanking period which starts after the completion of charge draining processes for both of an A-field and a B-field, A-field signal charges are transferred from an A-field group of photoelectric conversion elements to vertical transfer sections and are then transferred to storage sections. During the first vertical blanking period, after the A-signal charges are transferred to the storage sections, B-field signal charges are transferred from a B-field group of photoelectric conversion elements to the vertical transfer sections. After the first vertical blanking period and before a second vertical blanking period, the A-field signal charges are transferred from the storage sections to a horizontal transfer section and are then outputted from the horizontal transfer section as an A-field portion of a video signal. During the second vertical blanking period, the B-field signal charges are transferred from the vertical transfer sections to the storage sections. After the second vertical blanking period and before a third vertical blanking period, the B-field signal charges are transferred from the storage sections to the horizontal transfer section and are then outputted from the horizontal transfer section as a B-field portion of the video signal.

2 Claims, 6 Drawing Sheets

SOLID-STATE IMAGING APPARATUS AND METHOD OF DRIVING THE SAME

BACKGROUND OF THE INVENTION

This invention relates to a solid-state imaging apparatus using a CCD (charge-coupled device) image sensor. This invention also relates to a method of driving such a solid-state imaging apparatus.

Some prior-art solid-state imaging apparatuses having a CCD image sensor are used as both of a video camera and an electronic still camera. In general, a high resolution for moving pictures is required of a video camera while a high vertical resolution is required of an electronic still camera. It is generally difficult for the prior-art solid-state imaging apparatuses to meet both of the two different requirements.

SUMMARY OF THE INVENTION

It is an object of this invention to provide an improved solid-state imaging apparatus.

It is another object of this invention to provide an improved method of driving a solid-state imaging apparatus.

In this invention, during a first blanking period which starts after the completion of charge draining processes for both of an A-field and a B-field of a video signal, A-field signal charges are transferred from an A-field group of photoelectric conversion elements to vertical transfer sections and are then transferred to storage sections. During the first vertical blanking period, after the A-signal charges are transferred to the storage sections, B-field signal charges are transferred from a B-field group of photoelectric conversion elements to the vertical transfer sections. After the first vertical blanking period and before a second vertical blanking period of the video signal, the A-field signal charges are transferred from the storage sections to a horizontal transfer section and are then outputted from the horizontal transfer section as an A-field portion of the video signal. During the second vertical blanking period, the B-field signal charges are transferred from the vertical transfer sections to the storage sections. After the second vertical blanking period and before a third vertical blanking period of the video signal, the B-field signal charges are transferred from the storage sections to the horizontal transfer section and are then outputted from the horizontal transfer section as a B-field portion of the video signal.

DESCRIPTION OF THE PREFERRED EMBODIMENT

Figure 1:
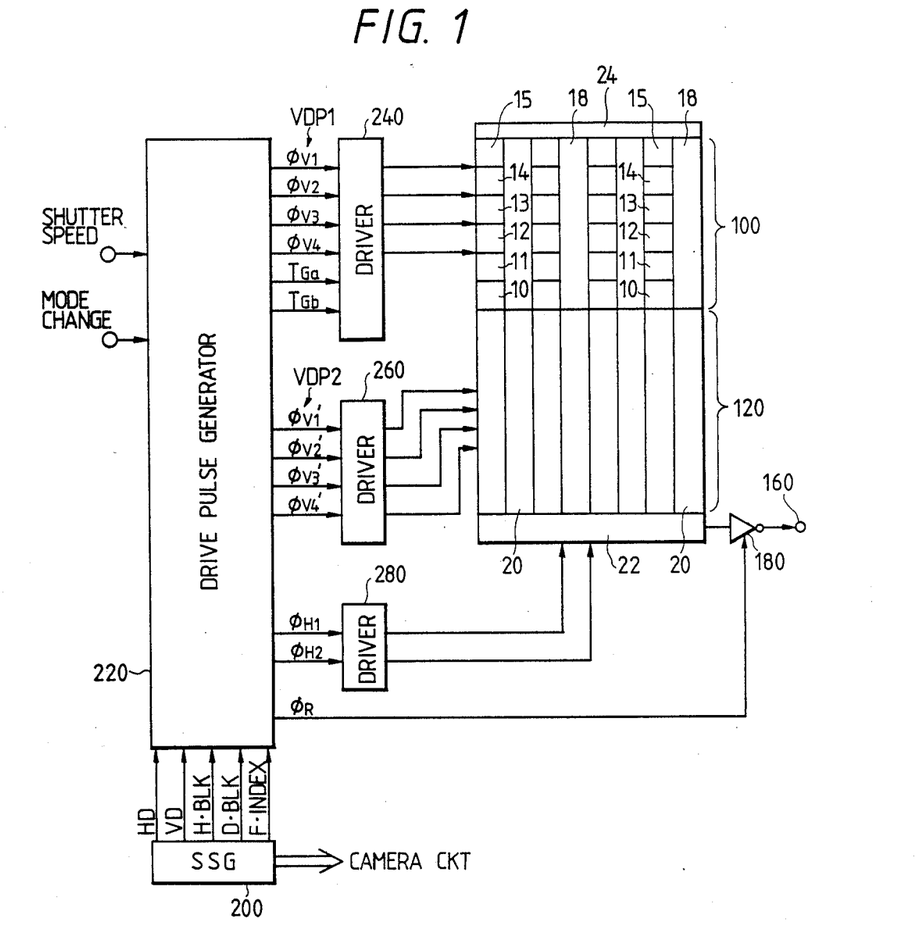
FIG. 1 is a block diagram of a solid-state imaging apparatus according to an embodiment of this invention.

With reference to FIG. 1, a solid-state imaging apparatus of a frame interline transfer type includes an image pickup section 100 having a two-dimensional array of photodiodes 10–15. Specifically, the photodiodes 10–15 are arranged in columns and rows. The photodiodes 10–15 are divided into two groups corresponding to the A-field (the first field) and the B-field (the second field) respectively. It should be noted that, for clarity, the image pickup section 100 is shown as having 4 columns and 6 rows of the photodiodes. The image pickup section 100 also has first vertical (interline transfer) CCDs 18 pairing with the respective columns of the photodiodes 10–15. Each first vertical CCD 18 includes a series combination of segments or cells. In each of pairs of the columns of the photodiodes 10–15 and the first vertical CCDs 18, the respective photodiodes 10–15 and CCD segments form sets by being coupled each other with transfer gates via which signal charges are transferred from the respective photodiodes to the corresponding CCD segments. Each set of the photodiodes and the first vertical CCDs has two control terminals. First control terminals of the sets in odd rows are connected in common to a first clock input terminal. Second control terminals of the sets in odd horizontal lines are connected in common to a second clock input terminal. First control terminals of the sets in even horizontal lines are connected in common to a third clock input terminal. Second control terminals of the sets in even horizontal lines are connected in common to a fourth clock input terminal. The first, second, third, and fourth clock input terminals are subjected to respective pulse trains $\phi V1$–$\phi V4$ of a 4-bit drive pulse signal VDP1. The pulse trains $\phi V1$–$\phi V4$ of the drive pulse signal VDP1 have a variable phase relationship as 4-phase pulse signals.

The above circuit arrangement regarding the image pickup section 100 is not shown in detail in FIG. 1, but is disclosed in the laid open European patent application No. 87307397.7 (publication number 0258001 A3) filed by the same applicant.

A storage or memory section 120 includes second vertical CCDs 20 whose upper ends are connected to lower ends of the first vertical CCDs 18 respectively. Each second vertical CCD 20 includes a series of segments or cells in a known manner. The segments of the second vertical CCDs 20 are connected to four clock input terminals subjected to respective pulse trains $\phi V1'$–$\phi V4'$ of a 4-bit drive pulse signal VDP2. The pulse trains $\phi V1'$–$\phi V4'$ of the drive pulse signal VDP2 have a fixed phase relationship as 4-phase pulse signals. The capacity of the storage section 120 is chosen so that the storage section 120 can store signal charges corresponding to one field.

A readout section includes a horizontal CCD 22 connected to lower ends of the second vertical CCDs 20. The horizontal CCD 22 is connected to an output terminal 160 via an amplifier 180. The horizontal CCD 22 is also connected to two clock input terminals subjected to drive pulse signals $\phi H1$ and $\phi H2$ respectively. The amplifier 180 is supplied with a reset pulse signal $\phi R$.

A drain 24 is connected to upper ends of the first vertical CCDs 18. Unnecessary charges are drained from the first vertical CCDs 18 to the drain 24 as described hereinafter.

A known standard signal generator 200 outputs a field index signal F·INDEX, a vertical blanking pulse signal V·BLK, a horizontal blanking pulse H·BLK, a vertical drive signal VD, and a horizontal drive signal HD to a drive pulse generator 220. A shutter speed signal and a mode change signal are applied to the drive pulse generator 220. The drive pulse generator 220 generates the pulse trains $\phi V1$–$\phi V4$, $\phi V1'$–$\phi V4'$, and $\phi H1$ and $\phi H2$, the reset pulse signal $\phi R$, and transfer gate pulse signals TGa and TGb on the basis of the input signals. The pulse trains $\phi V1$–$\phi V4$, and the transfer gate pulse signals TGa and TGb are fed to the image pickup section 100 via a driver 240. The pulse trains $\phi V1'$–$\phi V4'$ are fed to the storage section 120 via a driver 260. The drive pulse signals $\phi H1$ and $\phi H2$ are fed to the horizontal CCD 22 via a driver 280. The reset pulse signal $\phi R$ is directly fed to the amplifier 180.

A still mode of operation of the solid-state imaging apparatus will be described hereinafter with reference to FIGS. 2 and 3. Parts (a)–(j) of FIG. 2 correspond to moments and periods "a"–"j" of FIG. 3 respectively.

Figure 2:
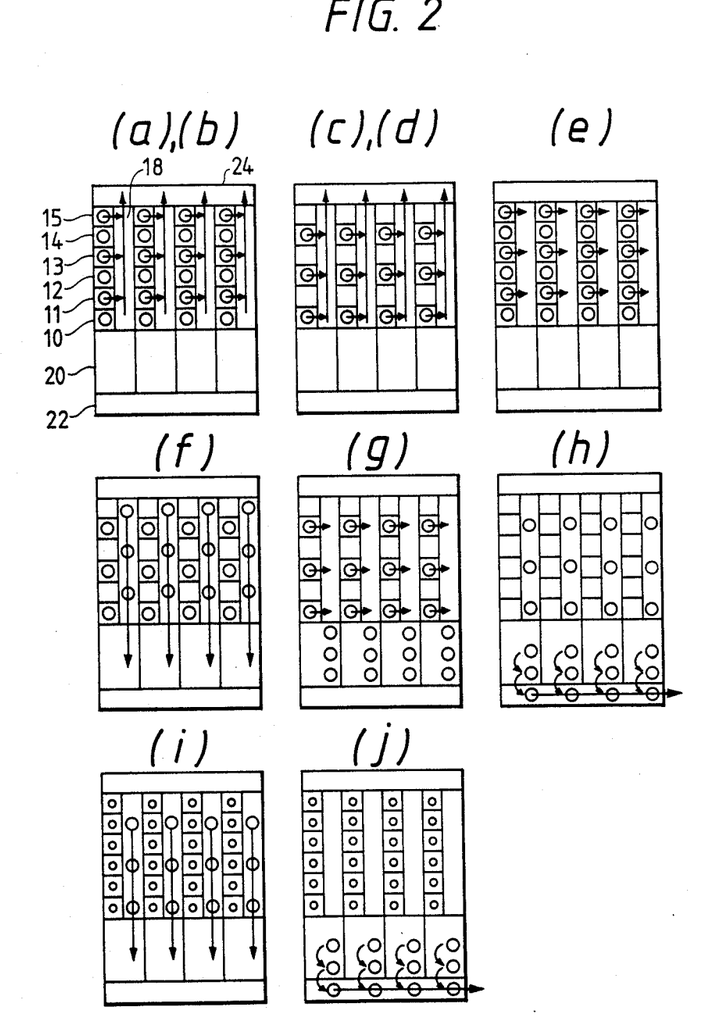
FIG. 2 is a diagram showing still-mode operation phases of the imaging apparatus of FIG. 1.
Figure 3:
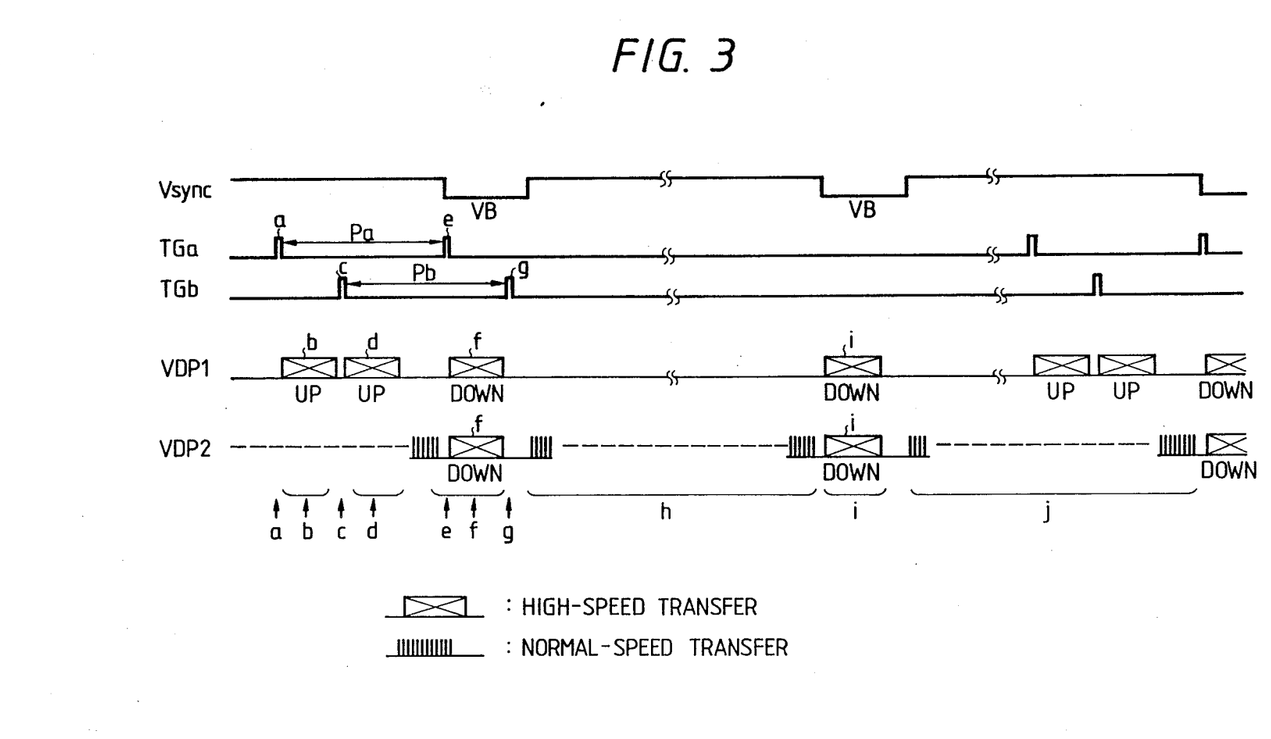
FIG. 3 is a timing diagram showing the waveforms of signals which occur during a still mode of operation of the imaging apparatus of FIG. 1.

During the still mode of operation of the solid-state imaging apparatus, at the initial moment "a" of FIG. 3, the transfer gate pulse TGa is applied to the transfer gates pertinent to the A-field (the first field) so that signal charges are transferred from the A-field photodiodes to the first vertical CCDs 18 as shown in the part (a) of FIG. 2. It should be noted that these signal charges of the A-field are not used for eventual signal generation.

During the period "b" of FIG. 3 which follows the moment "a", the drive pulses VDP1 are applied to the first vertical CCDs 18. The frequency of the drive pulses VDP1 is much higher than the frequency of the horizontal sync signal. During the period "b", the drive pulses VDP1 are designed so that the above-mentioned unnecessary signal charges of the A-field are drained from the first vertical CCDs 18 to the drain 24 at a high speed as shown in the part (b) of FIG. 2.

At the moment "c" of FIG. 3 which follows the period "b", the transfer gate pulse TGb is applied to the transfer gates pertinent to the B-field (the second field) so that signal charges are transferred from the B-field photodiodes to the first vertical CCDs 18 as shown in the part (c) of FIG. 2. It should be noted that these signal charges of the B-field are not used.

During the period "d" of FIG. 3 which follows the moment "c", the drive pulse signal VDP1 is applied to the first vertical CCDs 18. The frequency of the drive pulse signal VDP1 is much higher than the frequency of the horizontal sync signal. During the period "d", the drive pulse signal VDP1 is designed so that the unnecessary signal charges of the B-field are drained from the first vertical CCDs 18 to the drain 24 at a high speed as shown in the part (d) of FIG. 2.

During the vertical blanking period VB which follows the period "d", at the moment "e" of FIG. 3, the transfer gate pulse TGa is applied to the transfer gates corresponding to the A-field (the first field) so that signal charges are transferred from the A-field photodiodes to the first vertical CCDs 18 as shown in the part (e) of FIG. 2. It should be noted that these signal charges of the A-field are used for signal generation.

During the period "f" of FIG. 3 within the vertical blanking period VB and subsequent to the moment "e", the drive pulse signal VDP1 is applied to the first vertical CCDs 18 while the drive pulse signal VDP2 is applied to the second vertical CCDs 20. The frequencies of the drive pulse signals VDP1 and VDP2 are much higher than the frequency of the horizontal sync signal. During the period "f", the drive pulse signals VDP1 and VDP2 are designed so that the signal charges of the A-field to be used are transferred from the first vertical CCDs 18 to the second vertical CCDs 20 at a high speed as shown in the part (f) of FIG. 2. In an example where the total number of drive pulses for one first vertical CCD 18 and one second vertical CCD 20 is 490 and the frequency of the drive pulse signals VDP1 and VDP2 is 1 MHz, it takes about 0.25 ms to transfer signal charges of one field from the first vertical CCDs 18 to the second vertical CCDs 20.

During the vertical blanking period VB, at the moment "g" of FIG. 3 which follows the period "f", the transfer gate pulse TGb is applied to the transfer gates pertinent to the B-field (the second field) so that signal charges are transferred from the B-field photodiodes to the first vertical CCDs 18 as shown in the part (g) of FIG. 2. It should be noted that these signal charges of the B-field are not used.

During the period "h" of FIG. 3 which follows the vertical blanking period VB, the drive pulse signal VDP2 is applied to the second vertical CCDs 20 so that the signal charges of the A-field are transferred from the second vertical CCDs 20 to the horizontal CCD 22 one line by one line as shown in the part (h) of FIG. 2. During the period "h", the drive pulse signals $\phi H1$ and $\phi H2$ are continuously applied to the horizontal CCD 22 so that the signal charges of each line in the A-field are sequentially read out from the horizontal CCD 22 and are inputted into the amplifier 180. The amplifier 180 converts the signal charges of the A-field into a corresponding A-field portion of a video signal fed to the output terminal 160.

After the period "h" terminates, a subsequent vertical blanking period VB starts. During the period "i" of FIG. 3 within the vertical blanking period VB, the drive pulse signal VDP1 is applied to the first vertical CCDs 18 while the drive pulse signal VDP2 is applied to the second vertical CCDs 20. The frequencies of the drive pulse signals VDP1 and VDP2 are much higher than the frequency of the horizontal sync signal. During the period "i", the drive pulse signals VDP1 and VDP2 are designed so that the necessary signal charges of the B-field are transferred from the first vertical CCDs 18 to the second vertical CCDs 20 at a high speed as shown in the part (i) of FIG. 2.

During the period "j" of FIG. 3 which follows the vertical blanking period VB, the drive pulse signal VDP2 is applied to the second vertical CCDs 20 so that the signal charges of the B-field are transferred from the second vertical CCDs 20 to the horizontal CCD 22 one line by one line as shown in the part (j) of FIG. 2. During the period "j", the drive pulse signals $\phi H1$ and $\phi H2$ are continuously applied to the horizontal CCD 22 so that the signal charges of each line in the B-field are sequentially read out from the horizontal CCD 22 and are inputted into the amplifier 180. The amplifier 180 converts the signal charges of the B-field into a corresponding B-field portion of the video signal to be fed to the output terminal 160.

In this way, the still mode of operation of the solid-state imaging apparatus is completed for one frame. Such operation is periodically reiterated at the frame frequency. In FIG. 3, the period Pa between the moments "a" and "e" is a picture information storage time of the A-field. The period Pb between the moments "c" and "g" is a picture information storage time of the B-field. The lengths of the storage times Pa and Pb are equal each other. The equal lengths of the storage times Pa and Pb prevents flickers in reproduced pictures.

In general, The video signal outputted from the amplifier 180 is converted into a normal composite video signal. Still images represented by the composite video signal can be sequentially recorded by a typical helical scan VTR.

It is understood from the previous description that the solid-state imaging apparatus may have a capability of electronic shutter whose operating speed is determined by the signal storage times Pa and Pb. Specifically, the operating speed of the electronic shutter depends on the timings of the application of the transfer gate pulses TGa and TGb. The operating speed of the electronic shutter is preferably variable in the range of 1/60 to 1/2000 second. The operating speed of the electronic shutter may be higher than this range. It is possible to obtain a very high operating speed of the electronic shutter.

During the still mode of operation of the solid-state imaging apparatus, signal charges of the A-field and signal charges of the B-field are sampled and combined to form one frame of picture, and the timings of charge transfer for the A and B fields are very close each other so that a chance of image shift of moving object developed between the A and B fileds is very munch limited, this assures a clear picture in the resultant video signals. In other words, the reproduced pictures in the frame by frame still picture mode have virtually no double or blur images caused by the moving object.

A movie mode of operation of the solid-state imaging apparatus will be described hereinafter with reference to FIGS. 4 and 5. Parts (w)–(z) of FIG. 4 correspond to moments and periods "W"–"Z" of FIG. 5 respectively.

In the movie mode of operation of the solid-state imaging apparatus, during a first vertical blanking period VB1, signal charges of the A-field and signal charges of the B-field are transferred from the photodiodes to the first vertical CCDs 18 as in the still mode. During the first vertical blanking period, the signal charges of the A-field are transferred from the first vertical CCDs 18 to the second vertical CCDs 20 at a high speed as in the still mode.

Figure 4:
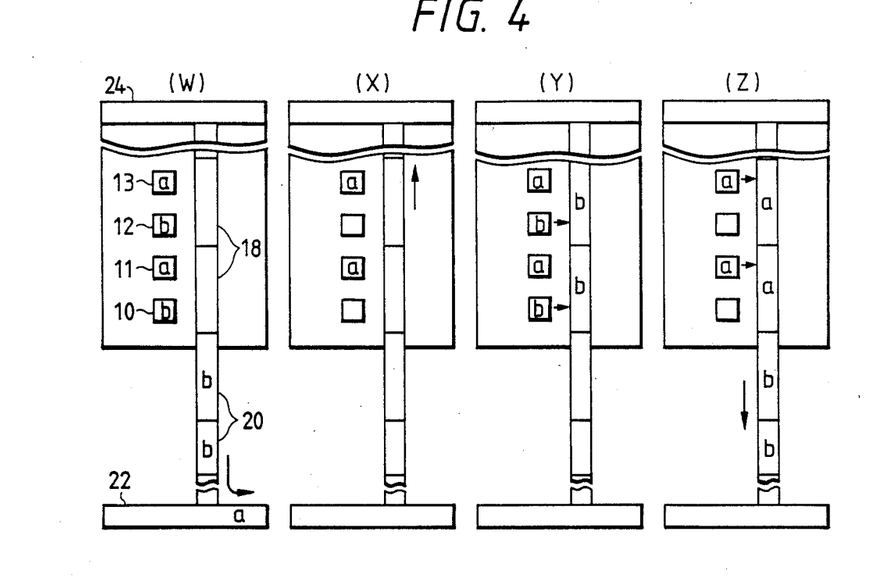
FIG. 4 is a diagram showing moving-mode operation phases of the imaging apparatus of FIG. 1.
Figure 5:
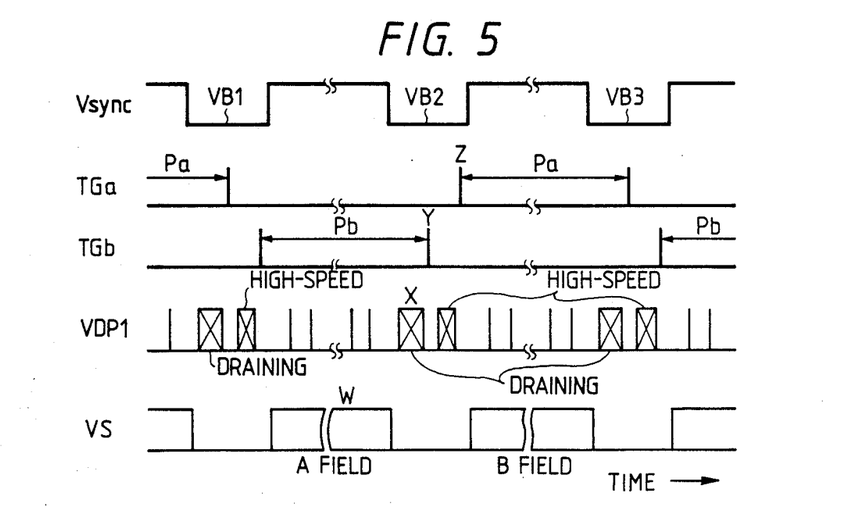
FIG. 5 is a timing diagram showing the waveforms of signals which occur during a moving mode of operation of the imaging apparatus of FIG. 1.

During the period "W" of FIG. 5 which follows the first vertical blanking period VB1, the signal charges of the A-field are transferred from the second vertical CCDs 20 to the horizontal CCD 22 one line by one line and the signal charges of the A-field are read out from the horizontal CCD 22 as shown in the part (w) of FIG. 4.

After the period "w" terminates, a second vertical blanking period VB2 starts. During the period "x" of FIG. 5 within the second vertical blanking period VB2, the drive pulse signal VDP1 is applied to the first vertical CCDs 18. During this period "X", the drive pulse signal VDP1 is designed so that the signal charges of the B-field are drained from the first vertical CCDs 18 to the drain 24 at a high speed as shown in the part (x) of FIG. 4.

At the moment "Y" of FIG. 5 within the second vertical blanking period VB2 and subsequent to the period "X", the transfer gate pulse TGb is applied to the transfer gates corresponding to the B-field (the second field) so that signal charges are transferred from the B-field photodiodes to the first vertical CCDs 18 as shown in the part (y) of FIG. 4.

During a period within the second vertical blanking period VB2 and subsequent to the moment "y", the signal charges of the B-field are transferred from the first vertical CCDs 18 to the second vertical CCDs 20 at a high speed.

At the moment "Z" of FIG. 5 within the second vertical blanking period and subsequent to the completion of the transfer of the signal charges of the B-field from the first vertical CCDs 18 to the second vertical CCDs 20, the transfer gate pulse TGa is applied to the transfer gates corresponding to the A-field (the first field) so that signal charges are transferred from the A-field photodiodes to the first vertical CCDs 18 as shown in the part (z) of FIG. 4.

During a period which follows the second vertical blanking period VB2, the signal charges of the B-field are transferred from the second vertical CCDs 20 to the horizontal CCD 22 one line by one line and the signal charges of the B-field are read out from the horizontal CCD 22.

After the readout of the signal charges of the B-field from the horizontal CCD 22 is completed, a third vertical blanking period VB3 starts. During the third blanking period VB3, the signal charges of the A-field are drained from the first vertical CCDs 18 to the drain 24.

In this way, the movie mode of operation of the solid-state imaging apparatus is completed for one frame. Such operation is periodically reiterated at the frame frequency. As understood from FIG. 5, in the movie mode, the information storage times Pa and Pb are in the range of 1/60 to 1/2000 second. Therefore, the image resolution of a moving object is considerably high.

Figure 6:
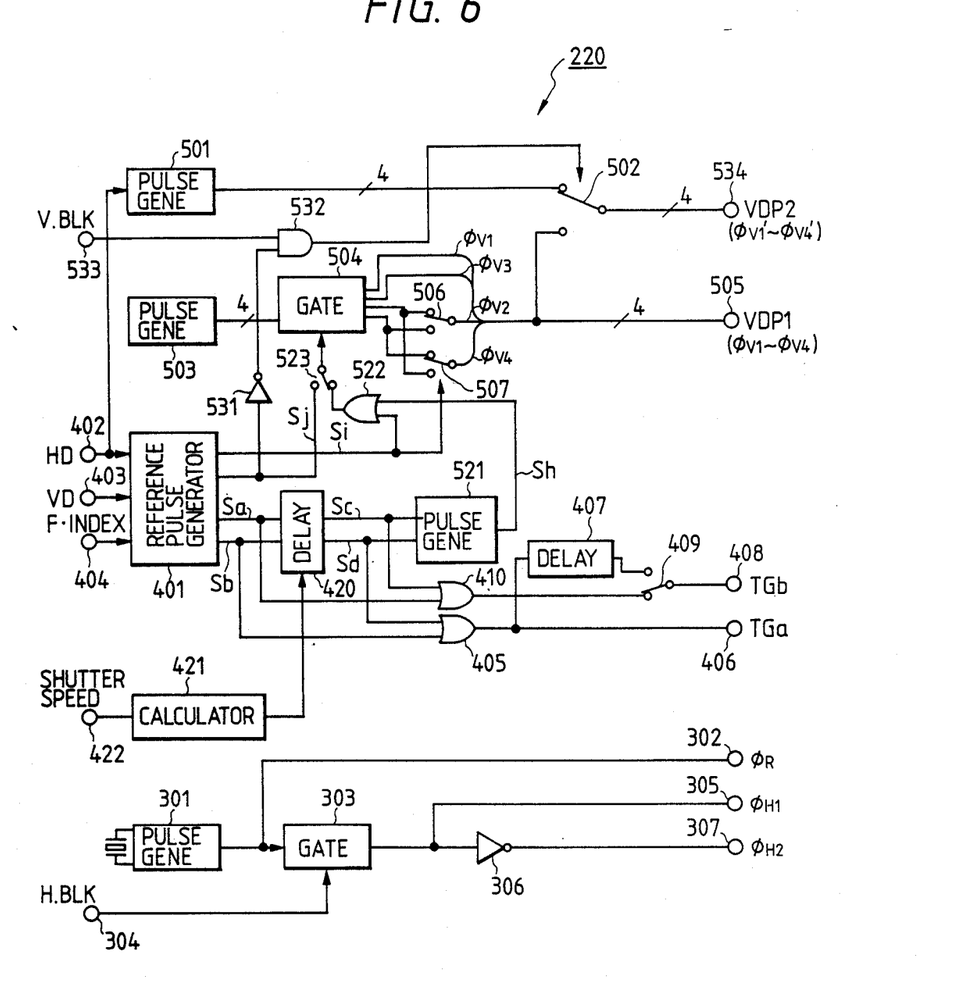
FIG. 6 is a block diagram of the drive pulse generator of FIG. 1.
Figure 7:
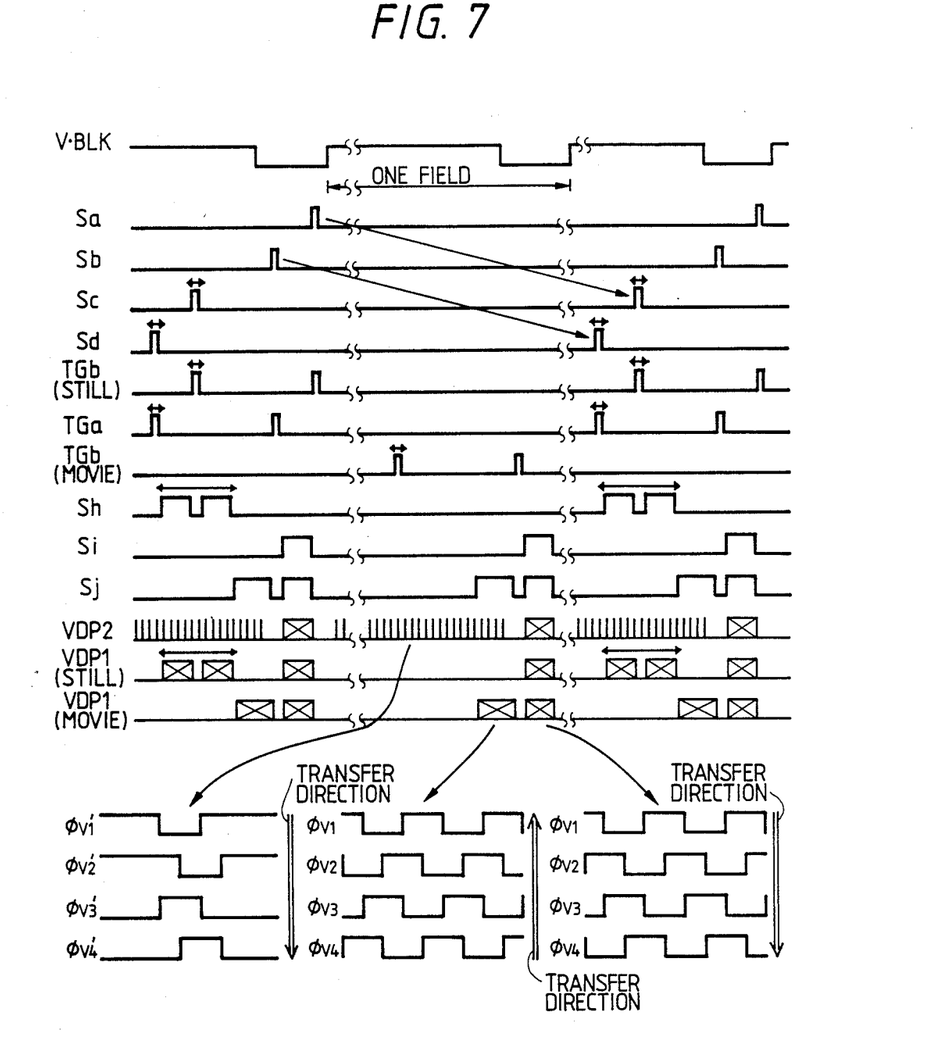
FIG. 7 is a timing diagram showing the waveforms of signals in the drive pulse generator of FIG. 6.

The drive pulse generator 220 will be described hereinafter with reference to FIGS. 6 and 7. As shown in FIG. 6, the drive pulse generator 220 includes a fixed-frequency pulse generator 301 outputting the reset pulse signal φR to an output terminal 302 and an input terminal of a gate 303. The gate 303 is blocked and opened in response to the horizontal blanking pulse signal H·BLK fed via an input terminal 304. The gate 303 outputs the drive pulse signal φH1 to an output terminal 305 and an input terminal of an inverter 306. The inverter 306 outputs the drive pulse signal φH2 to an output terminal 307.

The drive pulse generator 220 includes a reference pulse generator 401 which outputs signals Sa, Sb, Si, and Sj in response to the horizontal drive signal HD, the vertical drive signal VD, and the field index signal F·INDEX fed via input terminals 402, 403, and 404 respectively. The waveforms of the signals Sa, Sb, Si, and Sj are shown in FIG. 7. A variable delay circuit 420 changes the signals Sa and Sb into corresponding delayed signals Sc and Sd respectively. The waveforms of the signals Sc and Sd are shown in FIG. 7. The signals Sb and Sd are applied to first and second input terminals of an OR gate 405. The OR gate 405 outputs the transfer gate pulse signal TGa to an output terminal 406 and to a one-field delay circuit 407. The delay circuit 407 is connected to an output terminal 408 via a mode selection switch 409. The switch 409 is selectively changed in accordance with the desired still or movie mode. The signals Sa and Sc are applied to first and second input terminals of an OR gate 410 respectively. The output terminal of the OR gate 410 is connected to the switch 409. The switch 409 generates the transfer gate pulse signal TGb on the basis of the output signals from the devices 407 and 410. The transfer gate pulse signal TGb is fed to the output terminal 408.

A calculator 421 generates a delay control signal in accordance with the shutter speed signal fed via an input terminal 422. The delay control signal is applied to the delay circuit 420. The device 420 delays the signals Sa and Sb by a time which varies as a function of a shutter speed represented by the shutter speed signal. For example, the delay time is 263 H, 400 H, 462 H, 494 H, 510 H, and 517 H for a shutter speed of 1/60 second, 1/125 second, 1/250 second, 1/500 second, 1/1000 second, and 1/2000 second respectively.

A pulse generator 501 outputs a 4-bit pulse signal to a switch 502 in response to the horizontal drive signal HD. A pulse generator 503 outputs a 4-bit pulse signal to a gate 504. A first output terminal of the gate 504 outputs the pulse train $\phi$V1 to an output terminal 505 and the switch 502. A second output terminal of the gate 504 outputs the pulse train $\phi$V3 to the output terminal 505 and the switch 502. A third output terminal of the gate 504 is connected to the output terminal 505 and the switch 502 via a parallel combination of switches 506 and 507. A fourth output terminal of the gate 504 is connected to the output terminal 505 and the switch 502 via the parallel combination of the switches 506 and 507. The switches 506 and 507 are changed simultaneously in response to the signal Si. The switch 506 outputs the pulse train $\phi$V2 to the output terminal 505 and the switch 502. The switch 507 outputs the pulse train $\phi$V4 to the output terminal 505 and the switch 502. As a result, the terminal 505 is subjected to the 4-bit drive pulse signal VDP1 which has the pulse trains $\phi$V1-$\phi$V4. In addition, the switch 502 is subjected to the drive pulse signal VDP1.

A pulse generator 521 outputs a signal Sh to a first input terminal of an OR gate 522 in response to the signals Sc and Sd. The waveform of the signal Sh is shown in FIG. 7. The signal Si is applied to a second input terminal of the OR gate 522. A mode selection switch 523 receives the signal Sj and an output signal from the OR gate 522. The switch 523 is selectively changed in accordance with the desired still mode or movie mode. The gate 504 is opened and blocked in response to a signal fed via the switch 523.

An input terminal of an inverter 531 receives the signal Sj. An output signal from the inverter 531 is applied to a first input terminal of an AND gate 532. The vertical blanking pulse signal V·BLK is applied via an input terminal 533 to a second input terminal of the AND gate 532. The switch 502 selects one of the signal VDP1 and the output signal from the pulse generator 501 and passes the selected signal to an output terminal 534 in response to an output signal from the AND gate 532. The signal at the output terminal 534 constitutes the 4-bit drive pulse signal VDP2 which has the pulse trains $\phi$V1'-$\phi$V4'.

In the case of the draining signal charges from the first vertical CCDs 18 to the drain 24, the signal charges are moved upward along the first vertical CCDs 18. In the case of the transfer of signal charges from the first vertical CCDs 18 to the second vertical CCDs 20, the signal charges are moved downward along the first vertical CCDs 18. The change of the direction of the transfer of the signal charges in the first vertical CCDs 18 is performed by varying the phase relationship in the pulse trains $\phi$V1-$\phi$V4 as shown in FIG. 7. The switches 506 and 507 of FIG. 6 function to vary the phase relationship in the pulse trains $\phi$V1-$\phi$V4.

What is claimed is:

1. A solid-state imaging apparatus comprising:
photoelectric conversion elements arranged in columns and are further divided into rows of an A-field group and a B-field group corresponding to an A-field and a B-field of every frame of a video signal;
vertical transfer sections connected to the respective columns of the photoelectric conversion elements;
storage sections connected to the respective vertical transfer sections;
a horizontal transfer section connected to the storage sections;
a drain connected to the vertical transfer sections;
first means for transferring A-field signal charges from the A-field group of the photoelectric conversion elements to the vertical transfer sections;
second means for, after the A-field signal charges are transferred to the vertical transfer sections by the first means, draining the A-field signal charges from the vertical transfer sections to the drain;
third means for, after the A-field signal charges are drained from the vertical transfer sections by the second means, transferring B-field signal charges from the B-field group of the photoelectric conversion elements to the vertical transfer sections;
fourth means for, after the B-field signal charges are transferred to the vertical transfer sections by the third means, draining the B-field signal charges from the vertical transfer sections to the drain;
fifth means for, during a first vertical blanking period of the video signal which starts after the B-field signal charges are drained from the vertical transfer sections by the fourth means, transferring A-field signal charges from the A-field group of the photoelectric conversion elements to the vertical transfer sections;
sixth means for, during the first vertical blanking period, after the A-signal charges are transferred to the vertical transfer sections by the fifth means, transferring the A-field signal charges from the vertical transfer sections to the storage sections;
seventh means for, during the first vertical blanking period, after the A-signal charges are transferred to the storage sections by the sixth means, transferring B-field signal charges from the B-field group of the photoelectric conversion elements to the vertical transfer sections;
eighth means for, after the first vertical blanking period and before a second vertical blanking period of the video signal, transferring the A-field signal charges from the storage sections to the horizontal transfer section and outputting the A-field signal charges from the horizontal transfer section as an A-field portion of the video signal;
ninth means for, during the second vertical blanking period, transferring the B-field signal charges from the vertical transfer sections to the storage sections; and
tenth means for, after the second vertical blanking period and before a third vertical blanking period of the video signal, transferring the B-field signal charges from the storage sections to the horizontal transfer section and outputting the B-field signal charges from the horizontal transfer section as a B-field portion of the video signal.

2. In a solid-state imaging apparatus comprising photoelectric conversion elements arranged in columns and are further divided into rows of an A-field group and a B-field group corresponding to an A-field and a B-field of every frame of a video signal; vertical transfer sections connected to the respective columns of the photoelectric conversion elements; storage sections connected to the respective vertical transfer sections; a horizontal transfer section connected to the storage sections; and a drain connected to the vertical transfer sections; a method comprising the steps of:

(a) transferring A-field signal charges from the A-field group of the photoelectric conversion elements to the vertical transfer sections;

(b) after the A-field signal charges are transferred to the vertical transfer sections in the step (a), draining the A-field signal charges from the vertical transfer sections to the drain;

(c) after the A-field signal charges are drained from the vertical transfer sections in the step (b), transferring B-field signal charges from the B-field group of the photoelectric conversion elements to the vertical transfer sections;

(d) after the B-field signal charges are transferred to the vertical transfer sections in the step (c), draining the B-field signal charges from the vertical transfer sections to the drain;

(e) during a first vertical blanking period which starts after the B-field signal charges are drained from the vertical transfer sections in the step (d), transferring A-field signal charges from the A-field group of the photoelectric conversion elements to the vertical transfer sections;

(f) during the first vertical blanking period, after the A-signal charges are transferred to the vertical transfer sections in the step (e), transferring the A-field signal charges from the vertical transfer sections to the storage sections;

(g) during the first vertical blanking period, after the A-signal charges are transferred to storage sections in the steps (f), transferring B-field signal charges from the B-field group of the photoelectric conversion elements to the vertical transfer sections;

(h) after the first vertical blanking period and before a second vertical blanking period, transferring the A-field signal charges from the storage sections to the horizontal transfer section and outputting the A-field signal charges from the horizontal transfer section as an A-field portion of the video signal;

(i) during a second vertical blanking period of the video signal, transferring the B-field signal charges from the vertical transfer sections to the storage sections; and (j) after the second vertical blanking period and before a third vertical blanking period of the video signal, transferring the B-field signal charges from the storage sections to the horizontal transfer section and outputting the B-field signal charges from the horizontal transfer section as a B-field portion of the video signal.

* * * * *